Sept. 21, 1965 H. G. OSWIN ETAL 3,207,682
ACTIVATION OF ELECTRODES OF FUEL CELLS
Filed July 25, 1960
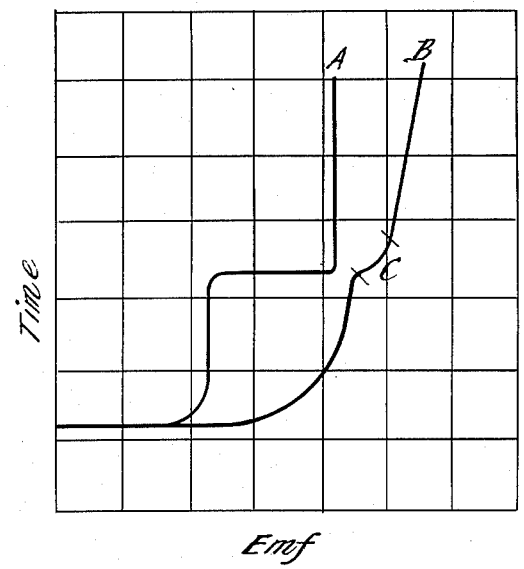
INVENTOR
Harry G. Oswin
George V. Young
BY Watson, Cole, Grindle & Watson
ATTORNEYS

United States Patent Office 3,207,682
Patented Sept. 21, 1965

3,207,682
ACTIVATION OF ELECTRODES OF FUEL CELLS
Harry Godfrey Oswin, Elmsford, and George Jamison Young, Alfred Station, N.Y., assignors to Leesona Corporation, Cranston, R.I., a corporation of Massachusetts
Filed July 25, 1960, Ser. No. 45,122
5 Claims. (Cl. 204—140)

This invention relates to a method of activating electrodes for fuel cells. More particularly the invention relates to an in situ conditioning of the surfaces of fuel cell electrodes.

"Fuel cell," as used in this specification is the common name applied to an electrochemical cell capable of generating electrical energy through the electrochemical combustion of a fuel gas with an oxygen containing gas. Such cells are not novel and have been fully described in the literature. Their precise construction and operation does not form a part of the instant invention except in an incidental capacity. However, a brief description of the nature and construction of a simple fuel cell is believed worthwhile to promote an understanding of the function and importance of the instant invention.

In general, the simplest fuel cell comprises a housing, a pair of electrodes and an electrolyte which acts as an oxygen transferring medium. An oxidizing gas such as air under super-atmospheric pressures is circulated on one side of the oxidizing electrode and a fuel gas such as hydrogen, under super-atmospheric pressure is circulated on one side of the other electrode. A three-phase interface exists at each electrode, i.e., gas, electrolyte, and solid where a process of adsorption and de-adsorption occurs, generating an electrochemical force. When current is drained from the two electrodes there is a net flow of electrons from the fuel gas side through an external electrical circuit to the oxidizing gas side. Thus, according to the external electron flow convention, the oxidizing gas electrode is the positive electrode and the fuel gas electrode the negative electrode. Oxygen is consumed at the positive electrode surface and fuel gas is oxidized into products of combustion at the negative electrode surface. The result is accompanied by release of a portion of the energy of combustion as electrical energy while the remainder is released as heat.

For efficient operation of a fuel cell, the surface condition of the electrodes is extremely important. For example, fuel electrodes generally should be in a clean metallic condition. Cathodes may be required to be either in a metallic or an oxidized state. However, it has previously been found to be particularly difficult to obtain an electrode in the metallic condition in a working cell since exposure to air, even the minor amounts of air dissolved in the electrolyte employed with oxidize the surface of most metals. It is, of course, impractical to dis-assemble a cell each time the electrode becomes corroded to clean the electrode. Therefore, as a practical matter most cells are operated at only partial efficiency.

Thus it is an object of this invention to provide an in situ method of activating an electrode in a newly assembled fuel cell.

It is another object of this invention to re-activate an electrode in a fuel cell after a period of use.

It is still another object of this invention to produce the desired surface condition on an electrode in a fuel cell after assembly by an in situ method, either by cathodic reduction of the electrode to a metallic condition or anodic oxidation to the oxidized state.

According to the instant invention, the desired surface condition is obtained at the cathode by the in situ reduction of the electrode to the metallic condition and at the anode, by the in situ oxidation of the electrode to the oxidized state. To achieve reduction of the cathode, an external current is applied, supplying electrons to the electrode to be reduced. In this process the second electrode of the system can be either the second electrode of the fuel gas cell, provided the electrode is not susceptible to harmful oxidation, or it can be a third inert electrode immersed in the electrolyte, as for example a porous carbon electrode, or it can be the cell container, if the container is capable of conduction of electrical current.

Accurate control of the potential of the cathode, and therefore, the current density, will reduce the metal oxide on the electrode surface before excessive hydrogen evolution occurs. The reduction is discontinued when the hydrogen evolution potential is reached. The above feature is of particular importance to the instant process inasmuch as the rapid formation of hydrogen gas inside porous carbons, or porous sintered metals can lead to disruption of the structure of hydrogen pressure build-up. On one occasion, during experimentation, no attempt was made to maintain the electrode potential below the hydrogen evolution over potential. As a result the activated porous carbon electrode was interally disintegrated. The anodic oxidation of metal to form a surface oxide layer on the anode can be performed by the instant in situ process in a similar manner.

Systems appropriate for performing the instant in situ process can be easily devised, or existing devices are available which are capable of modification to carry out the invention. It is only necessary that the system have a source of external current and a means of measuring the applied E.M.F. in order to determine when the hydrogen evolution potential is reached. The hydrogen evolution potential is determined by plotting E.M.F. vs. time.

Referring to the drawing, curve A is an example of an ideal curve for an unpolarized electrode. Curve B is an actual curve of an electrode which was reactivated. As is apparent from the curves, current is applied to the electrode to be reduced until the inflection of the curve is observed. Usually, in a curve plotting E.M.F. vs. time, the inflection becomes less marked with increasing current density; consequently, the end of the reduction is less easily determined. Therefore, it is desirable to accurately control the current density. Further, if complexing ions are present in the electrolyte the curve may be somewhat erratic but with due care the inflection point is readily observed.

The instant in situ process can be applied to electrodes fabricated from carbon or sintered metals such as nickel, cobalt, iron, iridium, rhodium, palladium, platinum, copper and silver or to any other metal or alloy which is capable of reduction. Further, the process can be applied to metals or alloys which are dispersed on carbons and graphites, or other conducting metals.

The process can be carried out in fuel cell systems operating with a variety of electrolytes, including acid and alkaline electrolytes. Suitable electrolytes include fused hydroxides, fused carbonates, or fused electrolytes which contain chlorine or nitrates to lower the melting point of the materials, as well as to dilute acids and aqueous alkaline electrolytes such as potassium hydroxide, sodium hydroxide and ethanolamine.

In the instant in situ process, the fuel cell can be partially or completely flooded with electrolyte. The method is also applicable to newly-assembled cells as well as to cells which are in need of reactivation, as for example a hydrogen oxygen cell in which the nickel electrode has been partly oxidized. The reactivation process has been found to be particularly applicable to cells using carbonaceous fuels where anode potentials are low and thus, allow surface oxidation to occur by an anodic process.

The novel in situ process will be described in greater detail to more particularly illustrate the invention. A source of D.C. voltage was connected to the fuel electrode of a fuel cell having a nickel electrode on the fuel gas side, a silver activated carbon electrode on the oxidizing gas side and utilizing an electrolyte composed of a 28% aqueous solution of sodium hydroxide, in series with a very large resistance. The resistance, being considerably larger than the resistance of the cell, allowed the maintenance of a constant current during the reduction and, consequently, a sharper E.M.F. vs. time curve. The applied E.M.F. was measured against a standard calomel electrode and recorded with a recording potentiometer. The E.M.F. was plotted against time to give curve B of the drawing. The reaction was terminated at inflection point C. The cell, after activation, was tested and observed to exhibit a substantially greater degree of efficiency than before activation.

Many modifications and variations of the present invention as hereinbefore set forth may be made without departing from the spirit or scope thereof and, therefore, only such limitations should be incorporated as are indicated in the appended claims.

It is claimed and desired to secure by Letters Patent:

1. An in situ method of activating the surface of a porous catalytic electrode of a fuel cell comprising connecting a source of direct current potential between said electrode and another electrode in said cell while maintaining the surface to be activated and said other electrode in contact with the electrolyte, said potential being sufficient to cause current flow through said electrode and said electrolyte, maintaining said current flow by increasing said potential, and disconnecting said applied potential substantially when the hydrogen evolution potential is reached.

2. The method of claim 1 wherein said electrode to be activated is the anode of said fuel cell and is connected to the negative side of said direct current potential.

3. The method of claim 1 wherein the electrode to be activated is the cathode of said fuel cell and is connected to the positive side of said direct current potential.

4. The method of claim 1 wherein the electrolyte is an acid solution.

5. The method of claim 1 wherein the electrolyte is an alkaline solution.

References Cited by the Examiner

UNITED STATES PATENTS

| | | | |
|---|---|---|---|
| 2,554,504 | 5/51 | Ruben | 136—31 |
| 2,600,526 | 6/52 | Friedman | 136—31 |
| 2,914,596 | 11/59 | Gorin et al. | 136—86 |
| 2,947,797 | 8/60 | Justi et al. | 136—86 |

JOHN H. MACK, *Primary Examiner.*

JOSEPH REBOLD, JOHN R. SPECK, *Examiner.*